(12) United States Patent
Harward

(10) Patent No.: US 8,127,701 B2
(45) Date of Patent: Mar. 6, 2012

(54) FABRIC JOINING METHOD AND SYSTEM

(75) Inventor: Randy Harward, Ojai, CA (US)

(73) Assignee: Patagonia, Inc., Ventura, CA (US)

( * ) Notice: Subject to any disclaimer, the term of this patent is extended or adjusted under 35 U.S.C. 154(b) by 967 days.

(21) Appl. No.: 12/103,637

(22) Filed: Apr. 15, 2008

(65) Prior Publication Data

US 2008/0264320 A1    Oct. 30, 2008

Related U.S. Application Data

(63) Continuation-in-part of application No. 10/906,392, filed on Feb. 17, 2005.

(60) Provisional application No. 60/578,760, filed on Jun. 9, 2004.

(51) Int. Cl.
*D05B 3/12* (2006.01)

(52) U.S. Cl. .................................. 112/475.17

(58) Field of Classification Search ............. 2/275, 69, 2/243.1; 156/73.1, 73.2, 304.1; 264/442; 112/402, 475.17, 475.21, 475.26
See application file for complete search history.

(56) References Cited

U.S. PATENT DOCUMENTS

| | | | |
|---|---|---|---|
| 3,615,994 A | 10/1971 | MacLaine et al. | |
| 3,819,437 A | 6/1974 | Paine | |
| 4,190,010 A | 2/1980 | Bibby | |
| 4,272,851 A | 6/1981 | Goldstein | |
| 4,775,581 A | 10/1988 | Siniscalchi | |
| 5,260,113 A | 11/1993 | Pontuti et al. | |
| 5,320,698 A | 6/1994 | Fournier et al. | |
| 5,322,724 A | 6/1994 | Levens | |
| 5,472,755 A | 12/1995 | Nibling, Jr. | |
| 5,595,804 A | 1/1997 | Korbel | |
| 5,682,618 A | 11/1997 | Johnson et al. | |
| 5,687,523 A | 11/1997 | Stough | |
| 5,691,051 A | 11/1997 | Matthews | |
| 5,824,175 A | 10/1998 | Hoopengardner | |
| 5,879,493 A * | 3/1999 | Johnson et al. | ............... 156/73.3 |
| 5,885,679 A | 3/1999 | Yasue et al. | |
| 6,048,810 A | 4/2000 | Baychar | |
| 6,103,325 A | 8/2000 | Zins et al. | |
| 6,124,032 A | 9/2000 | Bloch et al. | |
| 6,180,318 B1 | 1/2001 | Fitzer et al. | |
| 6,187,131 B1 | 2/2001 | Wenzel | |
| 6,471,803 B1 | 10/2002 | Pelland et al. | |
| 6,497,934 B1 | 12/2002 | Mahn, Jr. et al. | |

(Continued)

FOREIGN PATENT DOCUMENTS

DE   3710037   10/1988

(Continued)

*Primary Examiner* — Tejash Patel
(74) *Attorney, Agent, or Firm* — Lowe Graham Jones PLLC

(57) ABSTRACT

A fabric joining method and system for attaching a first piece of fabric having synthetic content to a second piece of fabric having synthetic content. The method includes welding the first piece of fabric to the second piece of fabric at a seam and sewing the first piece of fabric to the second piece of fabric using a stitch that crosses the welded seam. An example method includes ultrasonically welding a first piece of fleece fabric to a second piece of fleece fabric followed by stitching along and across the welded seam completely through the fabric layers using a zig-zag stitch. The system includes a first piece of fabric, a second piece of fabric fused to the first piece of fabric at a welded seam, and a thread stitched across the welded seam.

21 Claims, 4 Drawing Sheets

U.S. PATENT DOCUMENTS

| | | |
|---|---|---|
| 6,517,651 B2 | 2/2003 | Azulay |
| 6,521,067 B1 | 2/2003 | Clark |
| 6,622,312 B2 | 9/2003 | Rabinowicz |
| 6,649,251 B1 | 11/2003 | Druecke et al. |
| 6,971,965 B1 | 12/2005 | Shishido |
| 7,356,946 B2 * | 4/2008 | Hannon et al. .................. 36/45 |
| 2002/0022126 A1 | 2/2002 | Lodde |
| 2002/0167483 A1 | 11/2002 | Metcalf |
| 2002/0172792 A1 | 11/2002 | Jarvis et al. |
| 2003/0010439 A1 | 1/2003 | Fenton |
| 2003/0044563 A1 | 3/2003 | Kocinec et al. |
| 2003/0087090 A1 | 5/2003 | Carbonare |
| 2004/0221942 A1 | 11/2004 | Yu et al. |
| 2005/0022920 A1 | 2/2005 | Fowler |
| 2005/0066486 A1 | 3/2005 | Wood et al. |
| 2005/0114989 A1 | 6/2005 | Harward |
| 2007/0157366 A1 | 7/2007 | Cho |

FOREIGN PATENT DOCUMENTS

| | | |
|---|---|---|
| EP | 1491105 | 12/2004 |
| JP | 05-018064 | 1/1993 |
| JP | 05-156566 | 6/1993 |
| JP | 2000-211041 | 8/2000 |
| WO | 2005122806 | 12/2005 |

* cited by examiner

FABRIC JOINING METHOD AND SYSTEM

PRIORITY CLAIM

This application is a continuation-in-part of and claims priority to co-pending U.S. patent application Ser. No. 10/906,392 filed Feb. 17, 2005, titled "A Composite Seam System", which claims the benefit of U.S. Provisional Patent Application No. 60/578,760 filed Jun. 9, 2004, both of which are hereby incorporated by reference in their entirety.

FIELD OF THE INVENTION

This invention relates generally to fabric seaming methods and systems and, more specifically, to seaming methods and systems for outdoor apparel including synthetic material content.

BACKGROUND OF THE INVENTION

Garments for the outdoor athletic outerwear market can be divided into several main categories including hard shell, soft shell, and various types of laminated garments. In general, hard shell garments may be distinguished by the inclusion of a waterproofing barrier. Fleeces having a soft fabric generally of a knit construction are also used in the outerwear market, but these are not normally waterproof to the degree that hard shell garments are.

Because hard and soft shell garments are used during athletic and outdoor activities, it is desirable that they be light and rugged. For some applications, reducing the weight of the garment by even a small amount can be significant. In addition, from the manufacturer's point of view it is desirable that these garments be relatively simple to manufacture.

The method of joining pieces or panels of fabric to assemble a complete garment can be just as important to that garment's overall characteristics as the type of fabric used in that garment. While several prior-art methods exist for forming seams, each has its drawbacks. Simple conventional threaded stitching used alone, while common in the garment industry, is problematic because a completed stitch leaves a bulky seam in the otherwise lightweight fabric of the garment. Conventional threaded stitching typically requires lapped seams and/or a seam allowance of at least ⅛ of an inch. This requires additional fabric in the seam area and increases the weight and bulk of the garment. In waterproof garments, the passage of a needle through the fabric of the garment also compromises the waterproof nature of the fabric, necessitating the application of a seam tape secured with an adhesive over the stitched seam to ensure a waterproof seal.

However, gluing a length of seam tape over the stitched seam creates a new problem. Namely, a seam sewn in a traditional manner combined with tape tends to be rather stiff. The differential in stiffness between the taped seam formed by this process and the lightweight fabric joined by the sewn and taped seam leads to a phenomenon known as edge abrasion.

Because the region of the seam is much bulkier than the fabric panel which it joins, it causes a region of wear to build up just at the point where the fabric panel meets the taped seam. The continual flexing of the loose fabric against the stiff edge of the taped seam and any external abrasion causes the fabric to wear through at that point, reducing the life of an otherwise serviceable garment.

Alternatively, manufacturers have employed adhesives to join panels of fabric in a "stitchless" garment. Typically, what is known as a lap seam is made when two pieces of fabric are precut and overlapped. The pieces are secured with an adhesive applied in the area of overlap, which in some instances may require heating to fully interlock with the fibers of the fabric pieces.

However, the fabrics used in hard shell garments are usually either very tightly woven and/or have a durable water repellent ("DWR") finish applied to the fabric surface to provide waterproofing for the fabric. A fair amount of adhesive must be applied to make a bond of sufficient strength with a fabric having such a weave or finish, making the overall seam that much stiffer once the adhesive has solidified. As such, this method of stitchless garment construction can create an even stiffer seam than that of the sewn and taped seam described above, and so garments constructed with this process can suffer from the problem of edge abrasion to an even greater degree. Also, some fabrics cannot be reliably bonded in this manner and can fail in use.

A composite seam system as described in co-pending U.S. patent application Ser. No. 10/906,392 titled "A Composite Seam System", which is incorporated by reference herein in its entirety, overcomes some issues of the prior art by using an ultrasonically welded and taped seam. Although this composite seam system is suitable for some applications, it is not optimal for all types of fabrics and end uses. These types of seam systems are not optimal when using fleece, for example because it is difficult to adequately bond seaming tape to fleece fabrics when using only an ultrasonically welded seam for initial bonding. In applications that do not require waterproofing, the added bulk from seam tape is also not always desirable.

Accordingly, there is a need for a method of attaching fleece and other types of fabric to each other that results in a lightweight, non-bulky seam.

SUMMARY OF THE INVENTION

The present invention comprises a method for attaching a first piece of fabric to a second piece of fabric, each piece of fabric including synthetic content and a welded and stitched seam system. The method includes welding the first piece of fabric to the second piece of fabric at a seam, and sewing the first piece of fabric to the second piece of fabric using a stitch that crosses the welded seam.

In accordance with further aspects of the invention, the method includes sewing with a zig-zag stitch. In an example embodiment, the zig-zag stitch is a multi-stitch zig-zag stitch. Other stitches across the welded seam may alternatively be employed.

In accordance with other aspects of the invention, the method includes ultrasonically welding the first piece of fabric to the second piece of fabric. In an example embodiment, the method includes ultrasonically welding the first piece of fabric to the second piece of fabric using a process that concurrently removes excess fabric from the welded seam, such as by using a sharp wheel that cuts excess fabric as it welds, for example.

In accordance with still further aspects of the invention, the method includes welding a first piece of fleece fabric to a second piece of fleece fabric.

In accordance with yet other aspects of the invention, the method includes welding a first piece of laminated fabric having an outer shell layer and a second piece of fabric having an outer shell layer.

In accordance with still another aspect of the invention, welding includes welding a seam with a width of less than one millimeter and sewing includes sewing with a seam allowance between approximately 1/16 of an inch and 1/18 of an inch on the first and second pieces of fabric.

In accordance with yet another aspect of the invention, a seam system includes a first piece of fabric, a second piece of fabric fused to the first piece of fabric at a welded seam, and a thread stitched across the welded seam, wherein the first and second pieces of fabric include synthetic content.

In accordance with further aspects of the invention, the thread is stitched across the welded seam using a zig-zag stitch. In an example embodiment, the zig-zag stitch is a multi-stitch zig-zag stitch.

In accordance with still further aspects of the invention, the welded seam is an ultrasonically welded seam.

In accordance with additional aspects of the invention, the first piece of fabric is fleece fabric and the second piece of fabric is fleece fabric.

In accordance with yet other aspects of the invention, the first piece of fabric is a laminated fabric including an outer shell layer and the second piece of fabric is a laminated piece of fabric including an outer shell layer.

In accordance with other aspects of the invention, the welded seam has a width of less than one millimeter.

In accordance with still other aspects of the invention, the thread is stitched across the welded seam with a seam allowance on each side of between approximately 1/16 of an inch and 1/8 of an inch.

In accordance with still further aspects of the invention, a seamed portion of the first and second pieces of fabric does not extend beyond the welded seam.

As will be readily appreciated from the foregoing summary, the invention provides a method for attaching a first piece of fabric to a second piece of fabric, each piece of fabric including synthetic content and a welded and stitched seam system.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Figure 1:
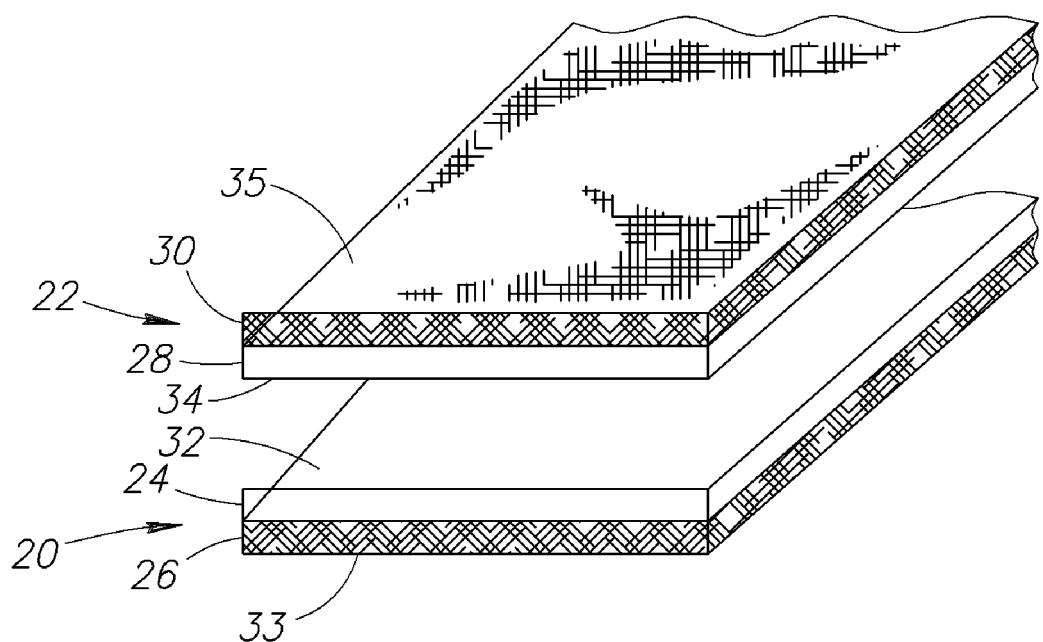
FIG. 1 shows a representation of two pieces of fabric before joining.

FIG. 1 shows a representation of a first piece of fabric 20 and a second piece of fabric 22 before they have been joined. The first piece of fabric 20 includes a first layer 24 and a second layer 26. The second piece of fabric 22 also includes a first layer 28 and a second layer 30. In an example embodiment, the first layers 24, 28 are outer shell layers and the second layers 26, 30 are inner fleece layers laminated to the first layers 24, 28 respectively. The first piece of fabric 20 includes a first face 32 on the first layer 24 and a second face 33 on the second layer 26. The second piece of fabric 22 includes a first face 34 on the first layer 28 and a second face 35 on the second layer 30. Before joining the two pieces of fabric 20, 22, the first piece of fabric 20 is placed facing the second piece of fabric 22. In the example shown, it is desired to weld the first face 32 of the first piece of fabric 20 to the first face 34 of the second piece of fabric 22 along a seam. The first and second pieces of fabric 20, 22 are shown slightly separated from each other for clarity, but before welding the pieces of fabric together, the two faces to be welded together would likely be touching. After the two pieces of fabric 20, 22 are placed together they are welded together along a desired seam.

Although the two pieces of fabric 20, 22 are shown as being laminated pieces of fabric having an outer and an inner layer, other types of fabric may also be used. Single layer fleece fabrics, or other types of laminated fabrics such as a three layer fabric having fleece outer layers and an inner barrier layer sandwiched between the fleece layers may also be used, for example. Typically, the layers that will be welded together will contain at least approximately 20% synthetic content. Some fabrics may be entirely synthetic, but other fabrics such as wool/polyester blends may also be used, for example. The fabrics may be woven, non-woven, laminated, or other types of fabrics.

The two pieces of fabric 20, 22 are preferably fused together at their edges by a sonic weld seam. In an exemplary embodiment, a commercially available sonic welder such as those produced by Sonobond, Inc. may be used to provide the sonic weld seam. The sonic welder may be used with a head having integral welding and cutting functions. The sonic weld seam is formed as the head of the sonic welder passes high frequency waves through the fabric pieces 20, 22 to be joined. These waves vibrate the fabric pieces 20, 22 creating heat through the friction of one fabric piece on the other. The sonic welding process essentially melts or otherwise fuses the edges of the fabrics together. The head of the welder may include a wheel having a profile that determines the width of the sonic weld seam made, as well as being made sharper on one side so that extraneous portions of the fabric pieces 20, 22 are trimmed off on a waste side of the sonic weld seam at the time the sonic weld seam is made. In a preferred embodiment, the width of the sonic weld seam is very small and is preferably less than one millimeter. In a further exemplary embodiment, little or no extra fabric from the fabric pieces 20, 22 remains beside the sonic weld seam after its formation.

By this process, the edges of the two fabric pieces 20, 22 have been sealed together. The sonic weld seam typically protects and stabilizes the edges of the fabric pieces 20, 22 to prevent fraying and to keep the edges reinforced. The sonic weld seam is not necessarily waterproof, nor is it strong enough alone to hold the fabric pieces 20, 22 together under normal wear. Accordingly, the fabric pieces 20, 22 are later stitched together to provide additional strength as described with respect to FIG. 5. Although ultrasonic welding is preferred, other types of welding may also be used to suit the needs of welding particular types of fabric, such as high frequency (HF) or radio frequency (RF) welding, for example.

Figure 2:
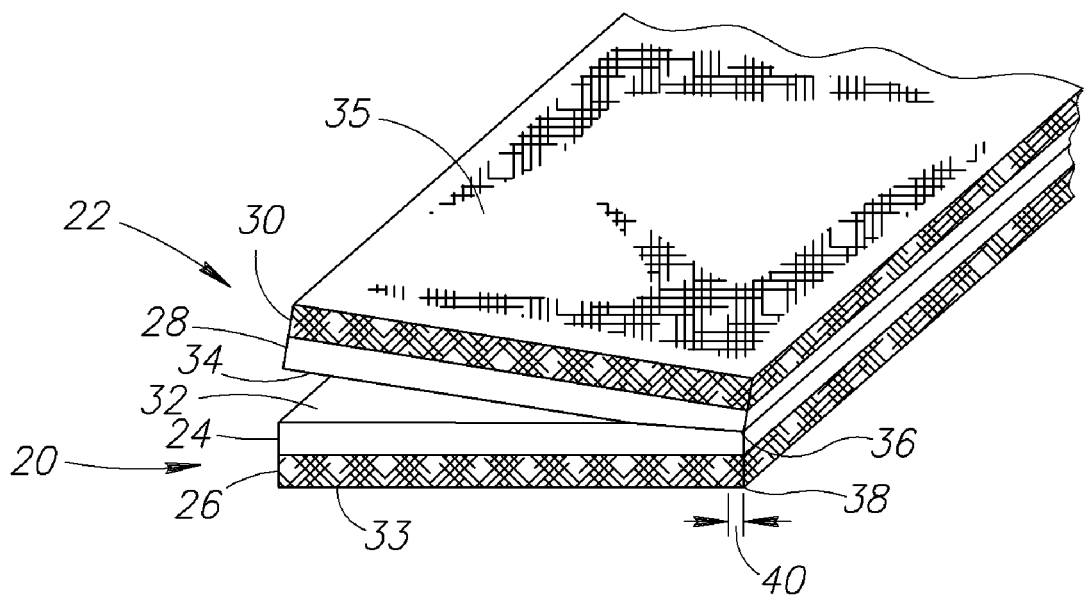
FIG. 2 shows the two pieces of fabric from FIG. 1 after they have been welded together.

FIG. 2 shows the two pieces of fabric 20, 22 from FIG. 1 after they have been welded together at a weld 36. Preferably, the weld 36 extends to an edge 38 of the first and second pieces of fabric 20, 22. In a preferred embodiment, the weld 36 is rather narrow and extends inward from the edge 38 a distance 40 of less than one millimeter.

Figure 3:
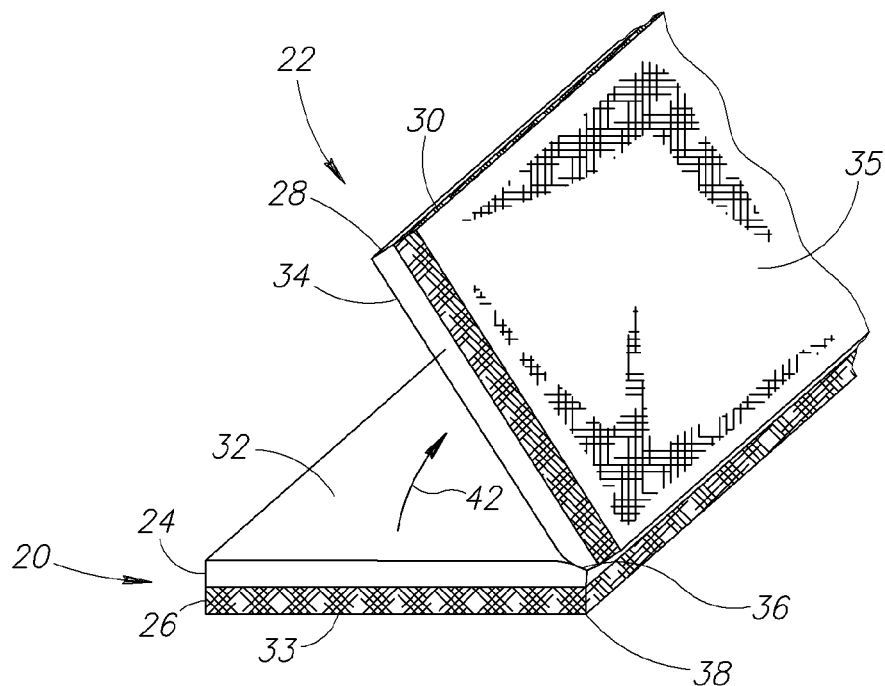
FIG. 3 shows the welded pieces of fabric from FIG. 2 in the process of being unfolded to expose a welded seam between them.

FIG. 3 shows the welded pieces of fabric 20, 22 from FIG. 2 in the process of being unfolded in a direction 42. After the welded pieces of fabric 20, 22 have been unfolded, a welded seam 44 is exposed as best seen in FIG. 4.

Figure 4:
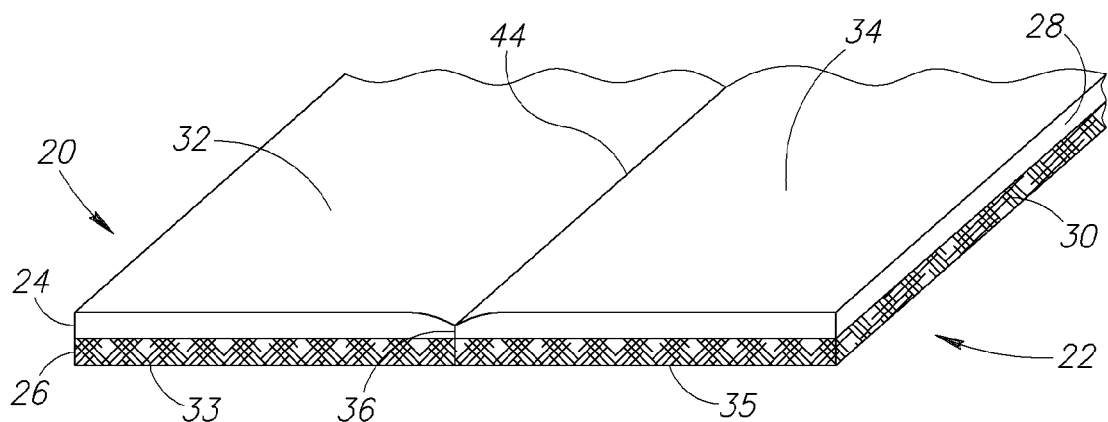
FIG. 4 shows the welded pieces of fabric in an unfolded position.
Figure 5:
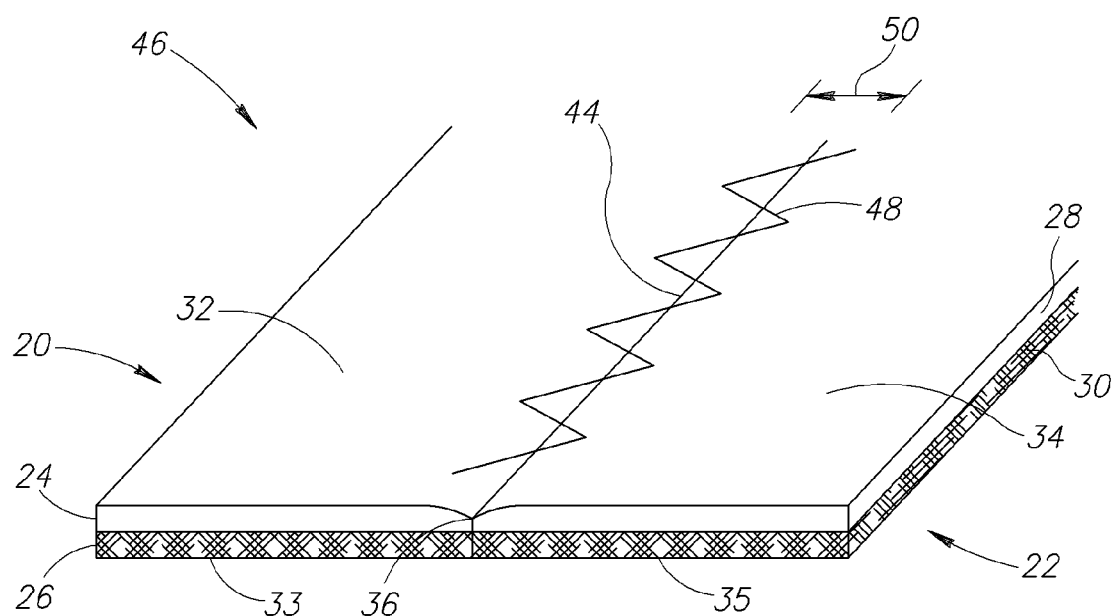
FIG. 5 shows the welded pieces of fabric of FIG. 4 after they have been stitched together along and across the welded seam to form a composite seam system formed in accordance with an embodiment of the invention.
Figure 6:
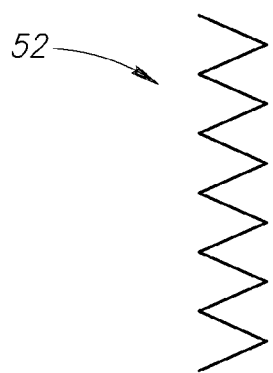
FIGS. 6 and 7 show examples of stitches that may be used to sew the pieces of fabric together after they have been welded.
Figure 7:
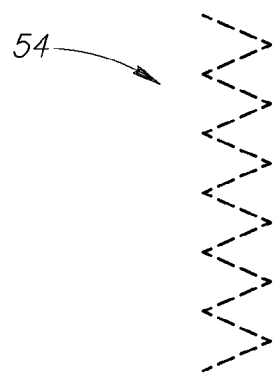

FIG. 5 shows the welded pieces of fabric 20 and 22 of FIG. 4 after they have been stitched together along and across the welded seam 44 to create a composite seam system 46 formed in accordance with an embodiment of the invention. The seam system 46 includes a stitch 48 that runs along and across the welded seam 44. Preferably, the stitch 48 extends completely through the pieces of fabric 20 and 22 so that thread used in the stitch will be present on both the first faces 32 and 34 and the second faces 33 and 35 of the pieces of fabric 20 and 22. The stitch 48 is also preferably has a width 50 that is approximately ⅛ to ¼ of an inch, with a resulting seam allowance of only 1/16 to ⅛ of an inch on each of the pieces of fabric 20 and 22. Narrower seam allowances than those typically used in conventional stitching alone are possible because of the protective effect the welded seam 44 provides for the edges of the pieces of fabric 20 and 22. Seam allowances outside the range of 1/16 to ⅛ of an inch may also be used. The stitch 48 may be a zig-zag stitch such as the zig-zag stitch 52 shown in FIG. 6 or a multi-step zig-zag stitch such as the multi-step zig-zag stitch 54 shown in FIG. 7, for example. A variety of single or multi-threaded other stitches may also be used, such as curves, squared off zig-zags, double needle cover stitches, flat seams such as a six threaded flat seam using four needles and two loopers, and many other types of commercial pattern stitches, for example. Many types of thread such as nylons, polyesters, textured fluff threads or cotton threads in multifilament or monofilament forms may be used. Extremely fine threads may also be used with fine needles to create less visible stitches. Stitches with a variety of stitch counts may also be used.

Figure 8:
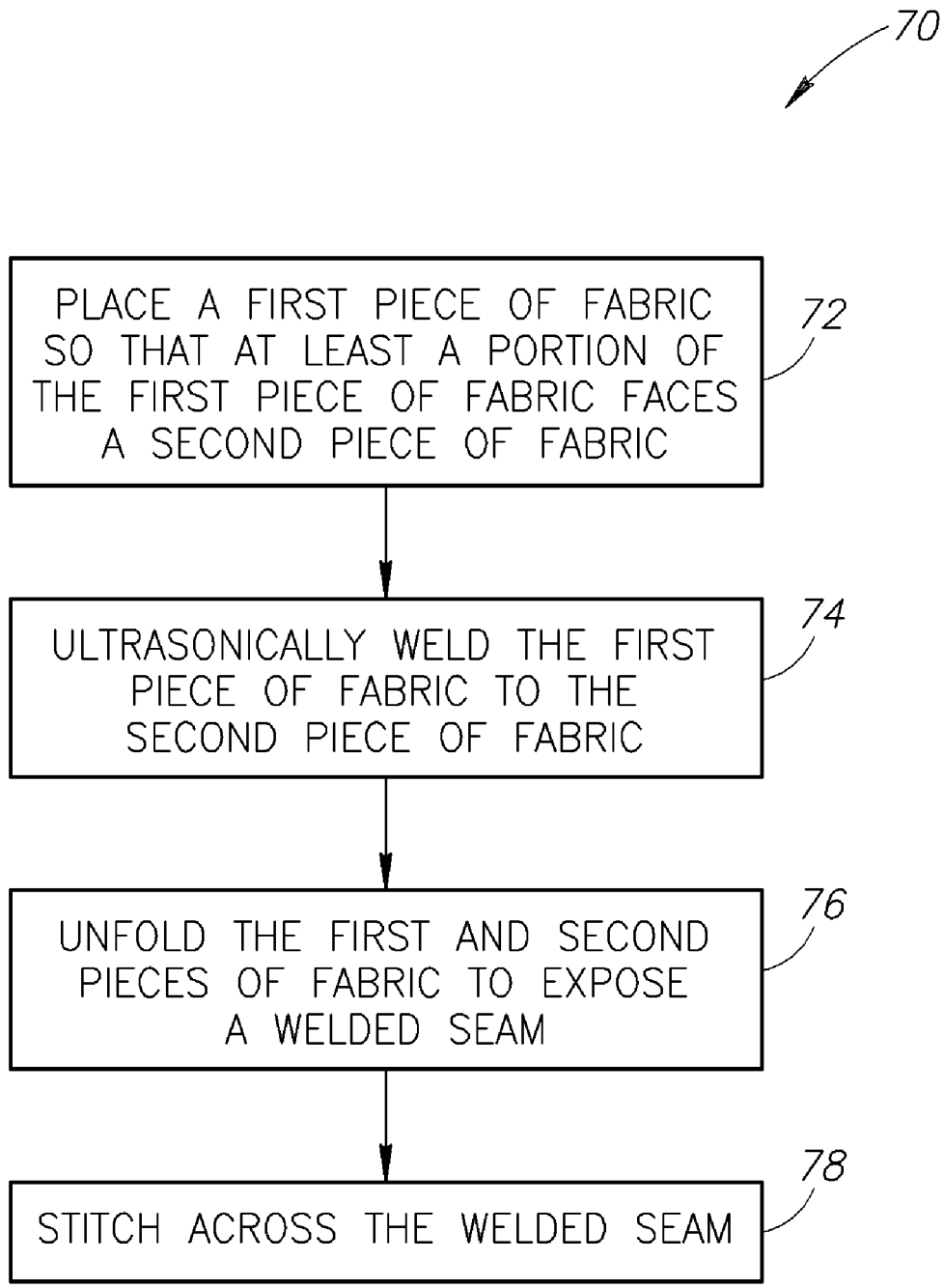
FIG. 8 is a flowchart of a method of joining two pieces of fabric together.

FIG. 8 is a flowchart of a method 70 of joining two pieces of fabric together. First, at a block 72, a first piece of fabric 20 is placed so that at least a portion of the first piece of fabric 20 faces a second piece of fabric 22. Next, at a block 74, the first piece of fabric 20 is ultrasonically welded to the second piece of fabric 22. This is preferably performed in the manner described with respect to FIG. 1. Then, at a block 76, the first and second pieces of fabric 20 and 22 are unfolded to expose a welded seam 44. Next, at a block 78, the two pieces of fabric 20 and 22 are stitched together across the welded seam 44. The stitching is preferably performed as described with respect to FIG. 5.

While the preferred embodiment of the invention has been illustrated and described, as noted above, many changes can be made without departing from the spirit and scope of the invention. For example, other types of fabric, welding methods, and stitching may be used. Additionally, the method and system may be combined with other methods and systems to provide additional desired characteristics to the seam such as by adding tape to all or a portion of the seam after stitching to provide increased water resistance. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method for attaching a first piece of fabric to a second piece of fabric, each piece of fabric including synthetic content, the method comprising:
   welding the first piece of fabric to the second piece of fabric at an outer perimeter edge of each piece of fabric;
   unfolding the welded-together pieces of fabric such that the first piece of fabric abuts the second piece of fabric along the outer perimeter edges with the outer perimeter edges in the same planar axis; and
   sewing the first piece of fabric to the second piece of fabric using a stitch that extends over each of the outer perimeter edges of the unfolded pieces of fabric.

2. The method of claim 1, wherein sewing includes sewing with a ziz-zag stitch.

3. The method of claim 2, wherein sewing includes sewing with a multi-stitch zig-zag stitch.

4. The method of claim 1, wherein welding includes ultrasonically welding.

5. The method of claim 4, wherein ultrasonically welding includes using a process that concurrently removes excess fabric from the welded seam.

6. The method of claim 5, wherein ultrasonically welding includes using a sharp wheel that cuts off excess fabric as it welds the pieces of fabric together.

7. The method of claim 1, wherein welding includes welding a first piece of fleece fabric to a second piece of fleece fabric.

8. The method of claim 1, wherein welding includes welding a first piece of laminated fabric having an outer shell layer and a second piece of fabric having an outer shell layer.

9. The method of claim 1, wherein welding includes welding a seam with a width of less than 1 millimeter.

10. The method of claim 1, wherein sewing includes sewing with a seam allowance between approximately 1/16 of an inch and ⅛ of an inch on the first and second pieces of fabric.

11. A composite seam system comprising:
    a first piece of fabric;
    a second piece of fabric fused to the first piece of fabric at a welded seam such that the welded seam joins an outer perimeter edge of the first piece of fabric which abuts an outer perimeter edge of the second piece of fabric lying in the same planar axis as the outer perimeter edge of the first piece of fabric; and
    a thread stitched across the welded seam which extends over both outer perimeter edges,
    wherein the first and second pieces of fabric include synthetic content.

12. The seam system of claim 11, wherein the thread is stitched across the welded seam using a zig-zag stitch.

13. The seam system of claim 12, wherein the ziz-zag stitch is a multi-stitch zig-zag stitch.

14. The seam system of claim 11, wherein the welded seam is an ultrasonically welded seam.

15. The seam system of claim 11, wherein the first piece of fabric is fleece fabric and the second piece of fabric is fleece fabric.

16. The seam system of claim 11, wherein the first piece of fabric is a laminated fabric including an outer shell layer and the second piece of fabric is a laminated piece of fabric including an outer shell layer.

17. The seam system of claim 11, wherein the welded seam is a micro-seam having a width of less than 1 millimeter.

18. The seam system of claim 11, wherein the thread is stitched across the welded seam with a seam allowance on each side of between approximately 1/16 of an inch and ⅛ of an inch.

19. The seam system of claim 18, wherein the seam allowance is approximately 1/16 of an inch.

20. The seam system of claim 11, wherein a seamed portion of the first and second pieces of fabric does not extend beyond the welded seam.

21. A method for attaching a first piece of fabric to a second piece of fabric, each piece of fabric including a layer of fleece having synthetic content, the method comprising:

ultrasonically welding the first piece of fabric to the second piece of fabric at a seam;

concurrently cutting away excess fabric from the seam as the first piece of fabric is welded to the second piece of fabric such that the weld is at an outer perimeter edge of each piece of fabric;

unfolding the welded-together pieces of fabric such that the first piece of fabric abuts the second piece of fabric along the outer perimeter edges with the outer perimeter edges in the same planar axis; and sewing across and along the welded seam using a stitch that extends over each of the outer perimeter edges of the unfolded pieces of fabric with a seam allowance between approximately $1/16$ of an inch and $1/8$ of an inch on the first and second pieces of fabric.

* * * * *